(No Model.)

J. U. HUBBARD.
DIE FOR FORMING AX POLL CLIPS.

No. 314,845. Patented Mar. 31, 1885.

ATTEST-
J. Henry Kaiser
Harry L. Ames

INVENTOR
John U. Hubbard
By S. W. Bates
his Atty.

UNITED STATES PATENT OFFICE.

JOHN U. HUBBARD, OF OAKLAND, MAINE.

DIE FOR FORMING AX-POLL CLIPS.

SPECIFICATION forming part of Letters Patent No. 314,845, dated March 31, 1885.

Application filed June 25, 1883. (No model.)

*To all whom it may concern:*

Be it known that I, JOHN U. HUBBARD, a citizen of the United States, residing at Oakland, in the county of Kennebec and State of Maine, have invented certain new and useful Improvements in Machinery for Making Heads for Axes, Hammers, &c., of which the following is a specification, reference being had therein to the accompanying drawings.

This invention relates to machinery for making steel heads for axes, hammers, hatchets, and other tools requiring steel heads.

My invention consists, briefly, of a machine for cutting off steel in square or oblong pieces having a short spur or projection at each corner, so that by driving the spurs against the end of an iron bar they will adhere to it until a welding heat can be obtained, after which they are welded to the end of the bar in the usual manner.

Figure 1:
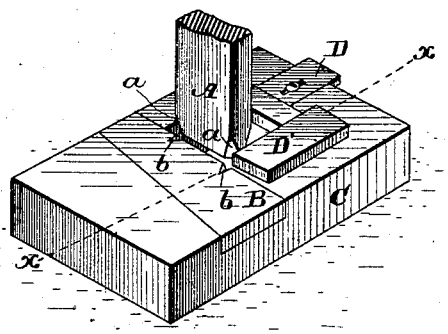
Figure 2:
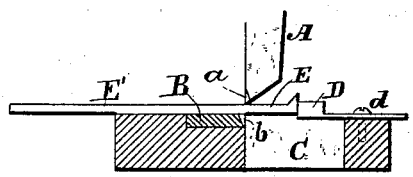
Figure 3:
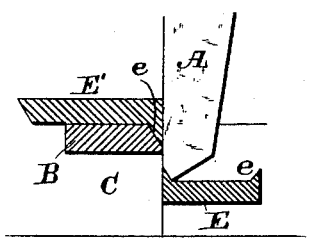

In the accompanying drawings, Figure 1 shows a perspective view of a machine for cutting off the steel heads. Fig. 2 shows section through $x\ x$ of Fig. 1. Fig. 3 is a section in detail showing steel head after being cut off.

A is a cutting die or punch having its corners $a\ a$ on the cutting-edge chamfered off. The bed-piece C contains the steel die B so set that the cutting-edge of A will pass in close contact with the edge of B in the usual manner. Two notches, $b\ b$, are cut in the edge of the die B at points exactly opposite the chamfered corners $a\ a$. The die A is the exact width of the steel bar to be cut, and hence the outside edges of notches $b\ b$ will come just at the edges of the bar. The punch A and die B may be removed and replaced by a wider or narrower punch and a die having corresponding notches.

D' is a fixed guide, and D is a movable guide working in a slot, so that it may be adjusted for cutting different lengths of steel heads.

The action of my machine is as follows, viz: The steel bar E' is thrust under the descending punch A, which comes down and cuts off a piece of steel, the length being governed by the position of the guide D. As it cuts off the head-piece E, it turns up two spurs, $e$—one on each side of the piece cut off—and it also turns down two spurs on the adjacent end of the bar remaining in the following manner, viz: As the punch A descends, that portion of the metal on either side of the bar which comes under the clipped corners $a\ a$ is not cut by the edge of the punch, but is sheared off. A portion of the metal is forced downward, filling the notches $b\ b$, (see Fig. 1,) and a portion is forced backward, filling the space between the clipped corners $a\ a$ and the edge of die D and the corner of the opening $c$. (See Fig. 3.) The bar E' when again fed in is turned, as in Fig. 2, and hence when the piece E is cut off it has a spur on each corner. The steel head thus formed is thrust against the end of an iron bar not heated, the spurs $e$ stick into the end of the bar, and it can then be handled, heated to a welding heat, and welded quickly. The end of the bar then becomes the head of the ax, a suitable length having been cut off, the poll punched, &c.

Hitherto steel heads have been welded to such tools as I have described when the tool was nearly formed, and the operation was done by heating the head of the tool and a flat piece of steel to a welding heat, then laying the two together and welding them in the usual manner.

By the use of my invention I do away with the separate heating of the two pieces before welding, and by heating them in contact with each other I secure a much more perfect weld.

I claim—

In a machine for making blanks for heads of axes, hammers, and like tools, the combination of the punch, having its corners clipped, with a bed-piece, C, having a counter-die, B, notched to correspond to the clipped corners of the punch, and the guides D D', substantially as described.

In testimony whereof I affix my signature in presence of two witnesses.

JOHN U. HUBBARD.

Witnesses:
S. W. BATES,
GEORGE H. BRYANT.